United States Patent [19]

Gaeddert

[11] 4,440,075
[45] Apr. 3, 1984

[54] ROUND BALER HAVING WRAPPING TWINE CUTTER

[75] Inventor: Melvin V. Gaeddert, Newton, Kans.

[73] Assignee: Hesston Corporation, Hesston, Kans.

[21] Appl. No.: 450,536

[22] Filed: Dec. 17, 1982

[51] Int. Cl.³ ............................................. B65B 13/18
[52] U.S. Cl. .......................................... 100/5; 100/13
[58] Field of Search ................ 100/5, 13, 88; 56/341, 56/343

[56] References Cited

U.S. PATENT DOCUMENTS 4,248,143  2/1981  Gaeddert ................................ 100/5

Primary Examiner—Billy J. Wilhite
Attorney, Agent, or Firm—Schmidt, Johnson, Hovey & Williams

[57] ABSTRACT

The dispensing end of a round baler's swingable twine dispenser projects outwardly through an aperture in the baler sidewall when the dispenser is in a standby position, and a twine severing blade is mounted to the sidewall proximal to the aperture. The twine is drawn across the severing blade and is thereby severed when the dispenser is returned to the standby position after twine has been dispensed along the length of a bale formed within the round baler's baling chamber.

5 Claims, 2 Drawing Figures

ROUND BALER HAVING WRAPPING TWINE CUTTER

TECHNICAL FIELD

This invention relates to rotary balers, and more particularly, to wrapping mechanism used in connection with winding or wrapping a suitable binding element such as twine around a bale formed within the chamber of the baler.

BACKGROUND ART

Various devices have heretofore been utilized in rotaby balers for severing twine after the twine has been wrapped around a bale along the length thereof just prior to ejecting the bale from the baler. Some of the severing mechanisms have included stationary devices presenting a sharp edge across which twine is drawn for severing of the twine as it is brought into contact with the sharp edge. A severing mechanism comprising a sharp edge must be mounted close to one sidewall of the baler so that the twine is severed when it is proximal the sidewall because an adequately wrapped around bale of hay advantageously includes twine wrapped around the longitudinal axis of the bale, and the longitudinal axis of the bale extends generally between the two sidewalls of a round baler. For the same reason, the twine dispenser must have a dispensing end that swings from a standby position proximal to one sidewall and a shifted position proximal to the opposite sidewall. Moreover, the dispensing end of the dispenser, when in the shifted position, must be close enough to the bale within the baling chamber that the tag end of the twine emerging from the dispenser will be caught up by the material forming the bale, thereby allowing the twine to be wrapped around the bale. As will be appreciated, the location of the dispensing end of the dispenser when in the standby position must be spaced apart from the sharp edge of the severing mechanism such that a tag end of sufficient length will be left whenever the twine is cut.

Round balers having wrapping twine cutters have in the past accommodated the above-mentioned requirements for location of the severing means, location of the dispensing end in a standby position relative to the severing means, and location of the dispensing means relative to the bale, in various manners. For instance, it has been known to provide twine dispenser with telescoping tubes such that the dispensing end of the dispenser tube can be extended so as to reach the bale within the baling chamber, and can be retracted so that when the dispensing tube is in the standby position the dispensing end is spaced apart a sufficient length from the severing mechanism to provide a tag end of adequate length. As will be appreciated, the requirement for a telescoping tube adds to the expense of twine dispensers, and the addition of moving parts cuts down on the reliability and durability of the dispenser.

A twine dispensing apparatus which would apply twine along the entire axial length of a round bale, and would include a dispensing end shiftable from a standby position that is spaced apart an adequate distance from a twine severing means, to a shifted position in close proximity to the bale within the baling chamber without the need for a telescopic tube, would be a decided advantage.

SUMMARY OF THE INVENTION

The problems outlined above are in large measure solved by the wrapping twine dispenser and cutter in accordance with the present invention. That is to say, the twine dispenser hereof includes a dispensing end shiftable along a path of travel between the sidewalls of a round baler for wrapping a bale along the entire axial length thereof and which is appropriately placed relative to the twine severing means and the bale without the need for and adjustable dispensing tube.

In more detail, the twine dispenser hereof includes a severing blade edge mounted proximal an aperture in one sidewall of the round baler, and includes a swingable twine dispensing arm having a dispensing end that can project outwardly through an aperture in the baler sidewall.

DETAILED DESCRIPTION

Figure 1:
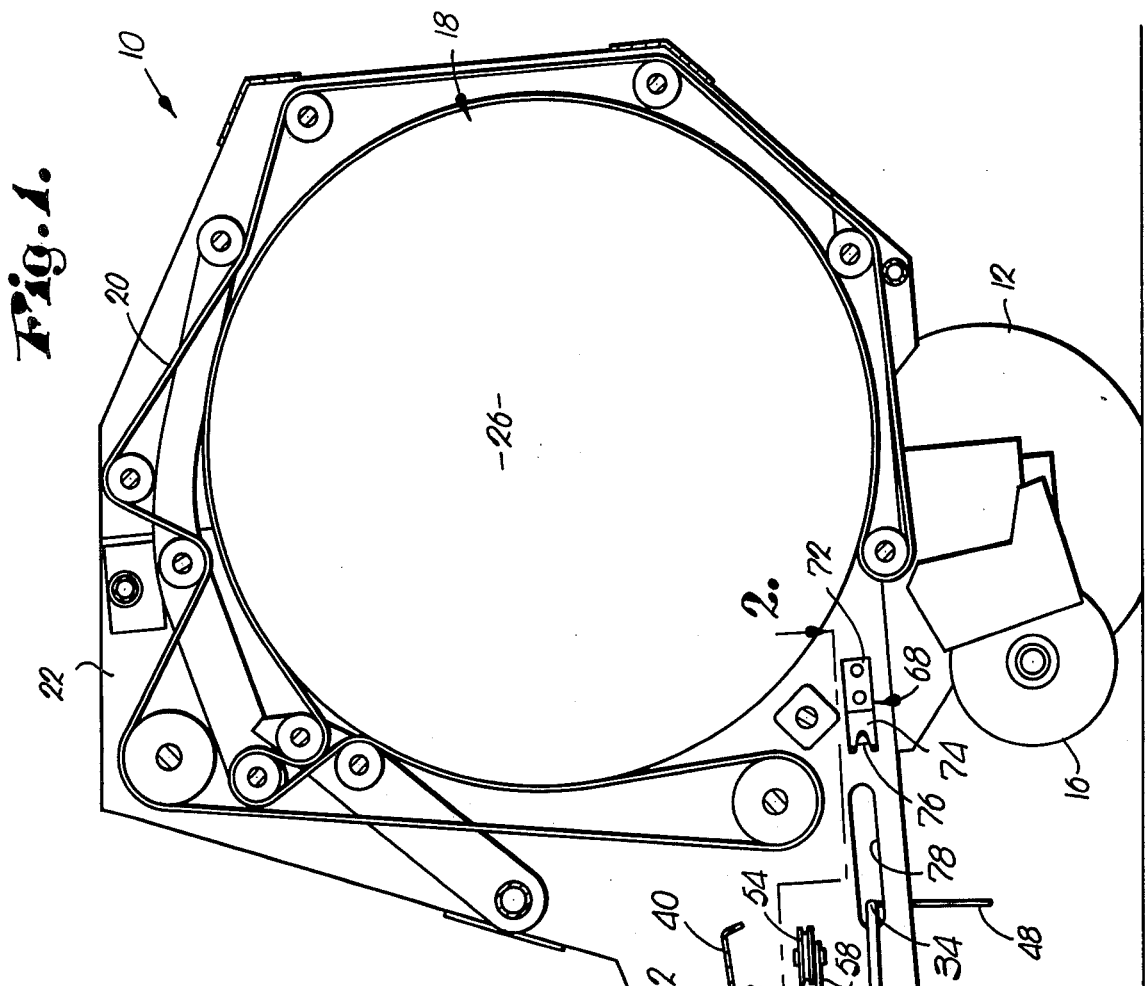
FIG. 1 is a side elevational view of a baler incorporating a wrapping twine cutter in accordance with the present invention, the near sidewall of the baler being removed to reveal details of the internal combustion.

The baler 10 is provided with ground wheels 12, a fore and aft extending tongue 14 adapted at its forwardmost end for attachment to a towing vehicle (not shown), a pickup 16 for lifting windrowed crop materials off the ground as the baler 10 advances over the ground, a baling chamber 18 defined by a series of endless belts 20 (only one belt depicted), and further defined by a pair of spaced apart sidewalls 22, 24 that extend forwardly from the baling chamber 18 and along the tongue 14. A bale 26 is depicted in FIG. 1 formed in chamber 18, and having a longitudinal axis extending between the baler sidewalls.

Apparatus 28 for applying twine to bale 26 is mounted forwardly of the bale 26 and generally within the tongue 14. Apparatus 28 includes an L-shaped dispensing tube 30 having a twine-receiving end 32 and a twine dispensing end 34. The twine-receiving end 32 of the dispensing tube 30 is received within a supporting sleeve 36. Sleeve 36 is mounted by bracket 38 to support member 40 extending between sidewalls 22, 24. A collar 42 is fixedly positioned to the dispensing tube 30, and is supported by sleeve 36. A twine dispensing device 44 is mounted on collar 42, as is the pointer of twine dispensing tube angle indicator 46. A strand of twine 48 is fed through dispensing tube 30 via tensioning device 44, and exits the tube 30 at the dispensing end 34.

Figure 2:
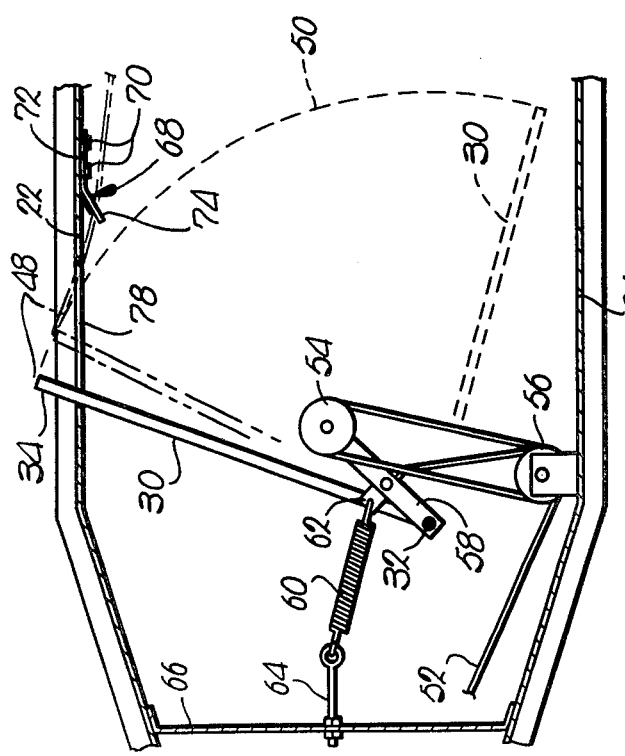
FIG. 2 is a fragmentary, sectional view of the wrapping twine cutter in accordance with the present invention taken along line 2—2 of FIG. 1.

Referring to FIG. 2, the path of travel of dispensing tube 30 between a standby position and a shifted position is depicted by dashed line 50. Apparatus for shifting the tube 30 along its path of travel includes rope 52 coupled to tube 30 via a pair of pulley wheels 54, 56 and actuating arm 58, and biasing spring 60. The rope 52 may advantageously lead to the operator station on the towing vehicle (not shown) for actuation of the twine dispensing mechanism by the operator. Spring 60 is mounted at one end thereof to actuating arm 58 by bracket 62, and is mounted at its other end via eye bolt 64 to cross piece 56.

A twine severing blade 68 is mounted to the inwardly directed face of sidewall 22 by a pair of bolts 70. The blade 68 includes a mounting portion 72 and a cutting edge portion 74 angled away from the mounting portion 72 and having a V-shaped notch in its outer end. An exposed cutting edge 76 extends across the notch in portion 74. The blade 68 is located in close proximity to an elongated aperture 78 in sidewall 22. The dispensing end 34 of dispensing tube 30 extends through aperture 78 when the tube 30 is in a standby position such that dispensing end 34 is disposed outwardly beyond the plane defined by sidewall 22.

In use, the spring 60 maintains the twine tube 30 in its standby position throughout the time the bale 26 is forming within the chamber 18. Once the bale 26 is fully formed, rope 52 is pulled forwardly by the operator, causing the dispensing end 34 of twine tube 30 to shift between its standby position proximal sidewall 22 to a shifted position proximal sidewall 24 along the path of travel depicted by dashed line 50. A portion of the twine 48 dangles from the dispensing end 32 of tube 30, as depicted in FIG. 1.

Once the twine tube 30 has swung sufficiently far rearwardly, the dangling end of twine 48 will be caught up in the new crop material being delivered to the chamber 18 by the pickup 16. The twine 48 will then commence wrapping around the bale 26 as the tube 30 continues to be swung along the length of the bale 26. The operator will normally terminate further advancement of the baler 10 over the ground at this time such that no new material is picked up, although the belts 20 will continue to be operated so that the bale 26 continues to spin within the chamber 18. Twine 48 is thereby coiled helically around and along the length of the bale 26 as the tube 30 shifts between the baler sidewalls. The position of the twine tube 30 along its path of travel may be determined by the operator by observing the position of the pointer of the twine tube angle indicating device 46.

The operator will allow the dispensing tube 30 to return to its standby position once the bale 26 has been adequately wrapped with twine. The dispensing end 34 of twine tube 30 will project through aperture 78 of sidewall 22 as the dispensing tube 30 is returned to its standby position. Twine 48 emanating from the dispensing 34 of the tube 30 and connected to the bale 26 will therefore be drawn across the cutting edge 76 of cutting blade 68, as depicted in phantom lines in FIG. 2. Once the dispensing end 34 has projected outwardly through aperture 78 beyond the plane of sidewall 22 to a sufficient extent, twine 48 will be severed by blade 68 having a tag end of twine extending from the dispensing tube. The fully wrapped bale 26 may then be discharged from the round baler.

I claim:

1. In a round baler having a baling chamber for spinning a cylindrical bale of material about its longitudinal axis during and after formation thereof, said chamber defined in part by a pair of spaced apart generally planar sidewalls and said axis extending generally between said sidewalls, and including means for wrapping said bale with twine prior to discharge of said bale from said chamber, improved means for applying said twine to said bale comprising:

a twine dispenser having a dispensing end shiftable between a standby position proximal one of said sidewalls and a shifted position proximal said sidewall opposite said one sidewall for dispensing twine along the longitudinal length of said bale; and twine severing means interposed between said bale chamber and the location of said dispensing end when said dispensing end is in said standby position, said dispensing end being disposed outwardly beyond the plane defined by said one sidewall when said dispenser is in said standby position, for drawing said twine across said severing means from the corresponding end of the bale and thereby severing said twine after said twine has been dispensed along the length of said bale.

2. The apparatus as claimed in claim 1, said one sidewall including structure defining an aperture therein, said dispensing end projecting outwardly through said aperture when said dispenser is in said standby position.

3. The apparatus as claimed in claim 1, said twine severing means being generally aligned with the plane defined by said one sidewall.

4. The apparatus as claimed in claim 1, said sidewall including an inwardly directed face, said severing means being mounted on said face.

5. The apparatus as claimed in claim 1, said severing means comprising a blade having a cutting edge thereon.

* * * * *